United States Patent [19]

Arseneault

[11] Patent Number: 5,188,421
[45] Date of Patent: Feb. 23, 1993

[54] ENTERTAINMENT AND FEEDING DEVICE FOR USE BY CHILDREN IN AUTOMOBILES

[76] Inventor: Barbara Arseneault, 13123 Peninsula Dr., Traverse City, Mich. 49684

[21] Appl. No.: 693,156

[22] Filed: Apr. 29, 1991

[51] Int. Cl.$^5$ ............................................. A47D 15/00
[52] U.S. Cl. .................................. 297/182; 297/188; 108/44
[58] Field of Search .................. 297/182, 188, 191; 108/44, 45, 46, 42; 5/94, 118

[56]    References Cited
          U.S. PATENT DOCUMENTS

| | | |
|---|---|---|
| 26,299 | 11/1867 | Burns . |
| 83,120 | 10/1868 | Mott . |
| 284,671 | 9/1883 | Rood ............................ 297/187 X |
| 818,045 | 4/1906 | Perry . |
| 1,022,886 | 2/1964 | Blanchard . |
| 1,050,205 | 1/1913 | Conley . |
| 1,309,343 | 7/1919 | Thomas . |
| 1,516,590 | 11/1924 | Dorsey . |
| 1,837,983 | 12/1931 | Moran . |
| 2,359,599 | 10/1944 | Allen ............................... 297/182 |
| 2,362,465 | 11/1944 | Carnor ........................... 297/182 X |
| 2,532,007 | 11/1950 | Biasell . |
| 2,608,454 | 8/1952 | Slattery ............................ 108/26 |
| 2,616,085 | 4/1952 | Bottolfsen . |
| 2,700,413 | 1/1955 | Williams . |
| 2,822,968 | 2/1958 | Jackson . |
| 3,003,163 | 10/1961 | Linden . |
| 3,744,435 | 7/1973 | Tracy et al. ....................... 108/26 |
| 4,298,228 | 11/1981 | Zampino et al. . |
| 4,659,143 | 4/1987 | MacLennan ...................... 297/182 |
| 4,687,248 | 8/1987 | Ross et al. ...................... 297/188 X |
| 4,770,107 | 9/1988 | Miller ................................ 108/44 |
| 4,824,168 | 4/1989 | Makoski ......................... 297/191 X |
| 4,848,834 | 7/1989 | Linski . |

OTHER PUBLICATIONS

One Step Ahead Catalog, items H, K and L.

Primary Examiner—Jose V. Chen
Attorney, Agent, or Firm—Lynn E. Cargill

[57]                  ABSTRACT

An entertainment and feeding device for use by a child in the back seat of an automobile is provided. The device is preferably formed from a flexible sheet which can be readily cleaned and folded for convenience of storage, and is designed to be easily installed and removed from the back seat of an automobile. The device has a forward end and a rearward end with side portions intermediate the forward and rearward ends. The side portions extend upwardly to provide sidewalls. The forward and rearward ends are anchored within the car interior by fasteners, such as buttons, snaps or VELCRO. The rearward fastener is designed for fastening around a child's waist while the forward fastener is designed to be fastened to a front seat head rest. The device is provided on its upper surface with entertainment pieces, a food tray, and storage compartments of various sizes for the convenience of storing a child's toys and games.

5 Claims, 3 Drawing Sheets

ENTERTAINMENT AND FEEDING DEVICE FOR USE BY CHILDREN IN AUTOMOBILES

TECHNICAL FIELD

The present invention generally relates to children's entertainment devices for use in automobiles. More specifically, this invention relates to a child's entertainment device which also serves as both a child's food tray and a device for protecting the interior of the automobile.

BACKGROUND OF THE INVENTION

Long trips in automobiles are generally tedious for all passengers, but are particularly so for children. To alleviate some of the boredom, children are typically given games, toys and books to occupy their time. As can be attested to by many parents, efforts to coordinate and organize such trips are severely exasperated by the added paraphernalia required to keep a young child content. In addition, the games, toys and books eventually become scattered throughout the interior of the automobile, further adding to the burden.

Travelling with a child becomes even more complicated by their sometimes erratic eating habits. In an attempt to avoid excessive stops, food is often packed in the car for the child to consume while on the road. As can be expected, the inevitable result is an automobile interior that is soiled with the food that does not succeed in being consumed by the child.

Consequently, parents will often look for ways to make trips more comfortable and pleasurable for the child, which directly or indirectly will reduce the burden on the parent. Past efforts include play pens such as that taught by U.S. Pat. No. 2,532,007 to Biasell. Biasell discloses a seat attachment that, as constructed within the confines of an automobiles back seat, forms a child's play pen. However, the play pen taught by Biasell cannot sufficiently contain the mess of which a child is capable, nor is it legal in many jurisdictions with child passenger restraint laws requiring infant child seats.

As can be appreciated from the above, it would be desirable to provide a device which is adapted to be easily installed within a car for purposes of confining a child's toys and games during extended automobile trips. It would be additionally desirable to provide a device which can serve to protect the car's interior when the child is eating.

Accordingly, what is needed is an entertainment and feeding device for use by children in automobiles which provides compartments for storing toys and games, a place setting for food service, and in addition is able to protect the interior of the car from being soiled by food.

SUMMARY OF THE INVENTION

According to the present invention there is provided a device which forms an enclosed play and eating area for use in the back seat of an automobile. The device is preferably formed from a flexible sheet which can be readily cleaned and folded for convenience of storage. In relation to its orientation as installed in the automobile, the device has a forward end and a rearward end with side portions intermediate the forward and rearward ends. The side portions extend upwardly to provide sidewalls to the sheet.

Attached to both the forward and rearward end of the sheet are forward and rearward fasteners, respectively, such as elongated straps provided with buttons, snaps or VELCRO. The rearward fastener is designed to be suitable for fastening around a child, preferably at the waist. The forward fastener is made to be suitable for fastening to any sufficiently rigid support, such as a front seat head rest. The fasteners are made of sufficient strength to support the device and a quantity of books and child's toys between its forward and rearward ends.

In addition, the device has one or more entertainment pieces, such as puppets and reflective foils, attached to the upper surface of the sheet. The device may also be provided with storage compartments of various sizes for the convenience of storing a child's toys and games. Finally, a food tray can be provided which is located on the upper surface of the sheet adjacent its rearward end. The food tray may be inverted to act as a flat play surface.

According to a preferred aspect of this invention, an inventive feature is that the entertainment and feeding device can be readily attached within an automobile with simple reusable fasteners. The fasteners support the device, keeping the device extended along its length between the front seat and the child. The device thereby provides coverage of the automobile's interior next to and directly in front of the child for purposes of containing any clutter or food mess the child creates. At any convenient opportunity, the device can be removed and cleaned before it is reinstalled, saving considerable time and effort in cleaning the interior of the automobile.

In addition, a significant advantage of the present invention is that the device has various provisions for entertainment, including pieces attached directly to the upper surface of the device and compartments for storing the personal favorites of the child.

Accordingly, it is an object of the present invention to provide a device for use in the back seat of an automobile for protecting the automobile's interior from a child's food, toys and games, and other debris.

It is a further object of this invention that such a device be easily installed and removed from the back seat for purposes of cleaning and storing.

It is still a further object of this invention that such a device be designed to have entertainment pieces and storage compartments, and accommodations for food served to a back seat child passenger for which it is intended.

Other objects and advantages of this invention will be more apparent after a reading of the following detailed description taken in conjunction with the drawings provided.

BRIEF DESCRIPTION OF THE DRAWINGS

The nature and extent of the present invention will be clear from the following detailed description of the particular embodiments thereof, taken in conjunction with the appendant drawings, in which.

DETAILED DESCRIPTION OF THE PREFERRED EMBODIMENT

Figure 1:
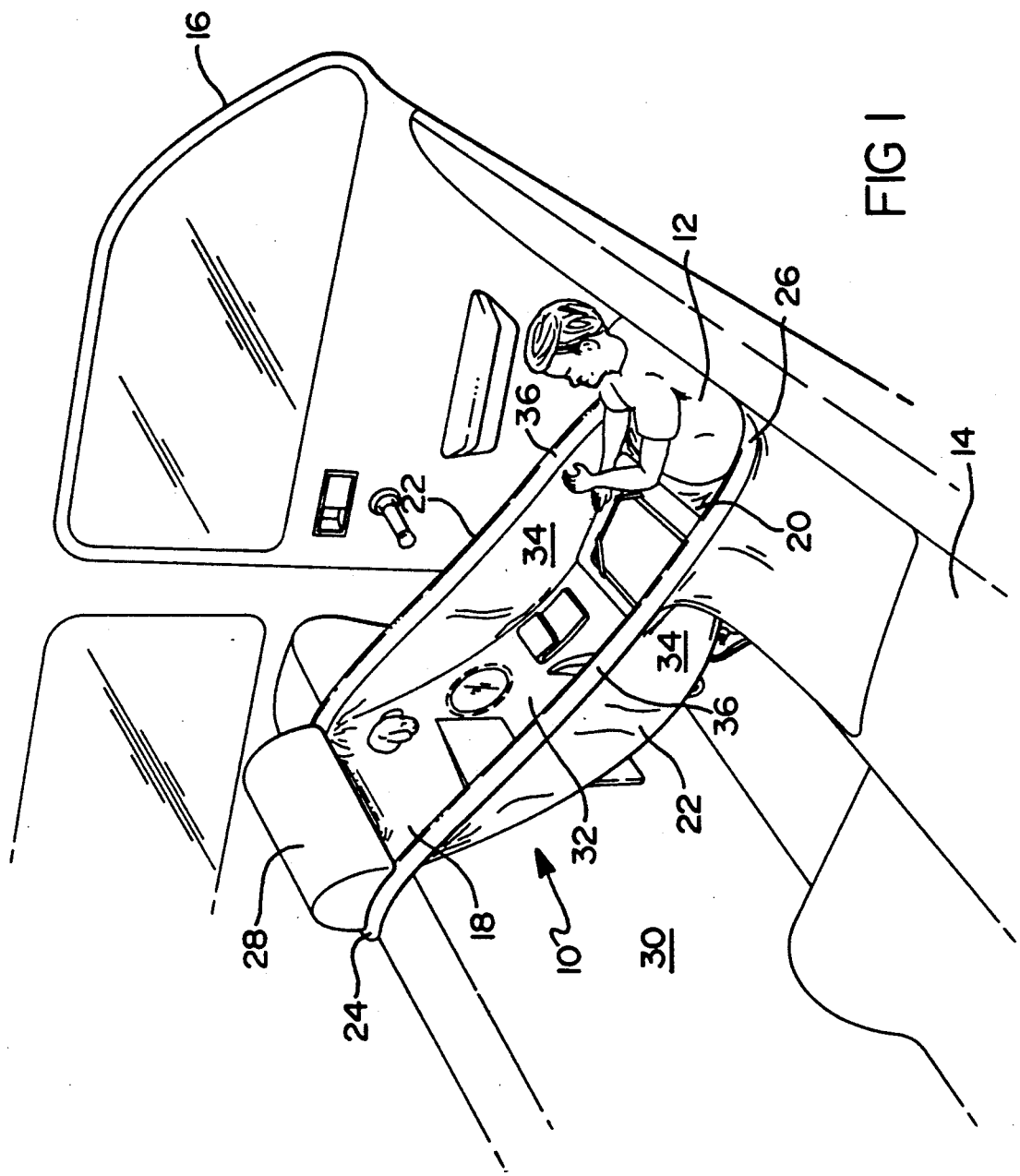
FIG. 1 shows an entertainment and feeding device as installed in the rear seat of an automobile in accordance with a preferred embodiment of this invention.

In a preferred embodiment of this invention, an entertainment and feeding device 10 is provided for use by a child occupant 12 in a rear seat 14 of an automobile 16 (shown in part), as seen in FIG. 1. The device 10 is generally comprised of a flexible sheet preferably made of a fabric material which is readily cleanable and ideally fire resistant. The device 10 has a forward end 18, a rearward end 20, and oppositely disposed side portions 22 which are intermediate the forward and rearward ends 18 and 20.

Attached to both the forward and rearward ends 18 and 20 are fasteners 24 and 26, respectively. The fasteners 24 and 26 can be any convenient form, such as elongated straps with snaps, buttons, or the more currently popular VELCRO. The rearward fastener 26 is sized to fasten around the waist of the child occupant 12. The forward fastener is adapted to be fastened to a suitable support, such as a front seat head rest 28. The device 10 is thereby supported between its forward end 18 and its rearward end 20 such that it is able to cover and protect the rear seat 14 and interior 30 of the automobile 16. The rearward fastener may also be fastened to the front seat head rest in such a way as to form a pack which rests against the back of the front seat. Although not shown in the Figures, this configuration clears the way to remove the child.

To further provide protection to the rear seat 14 and interior 30, the side portions 22 can extend upwardly from the upper surface 32 of the device 10 to form sidewalls 34. This can be accomplished by reinforcing the edges 36 of the side portions 22 to provide more rigidity such that the portion of the device between the forward and rearward ends 18 and 20 is suspended from the edges 36, as illustrated in FIG. 1.

Figure 2:
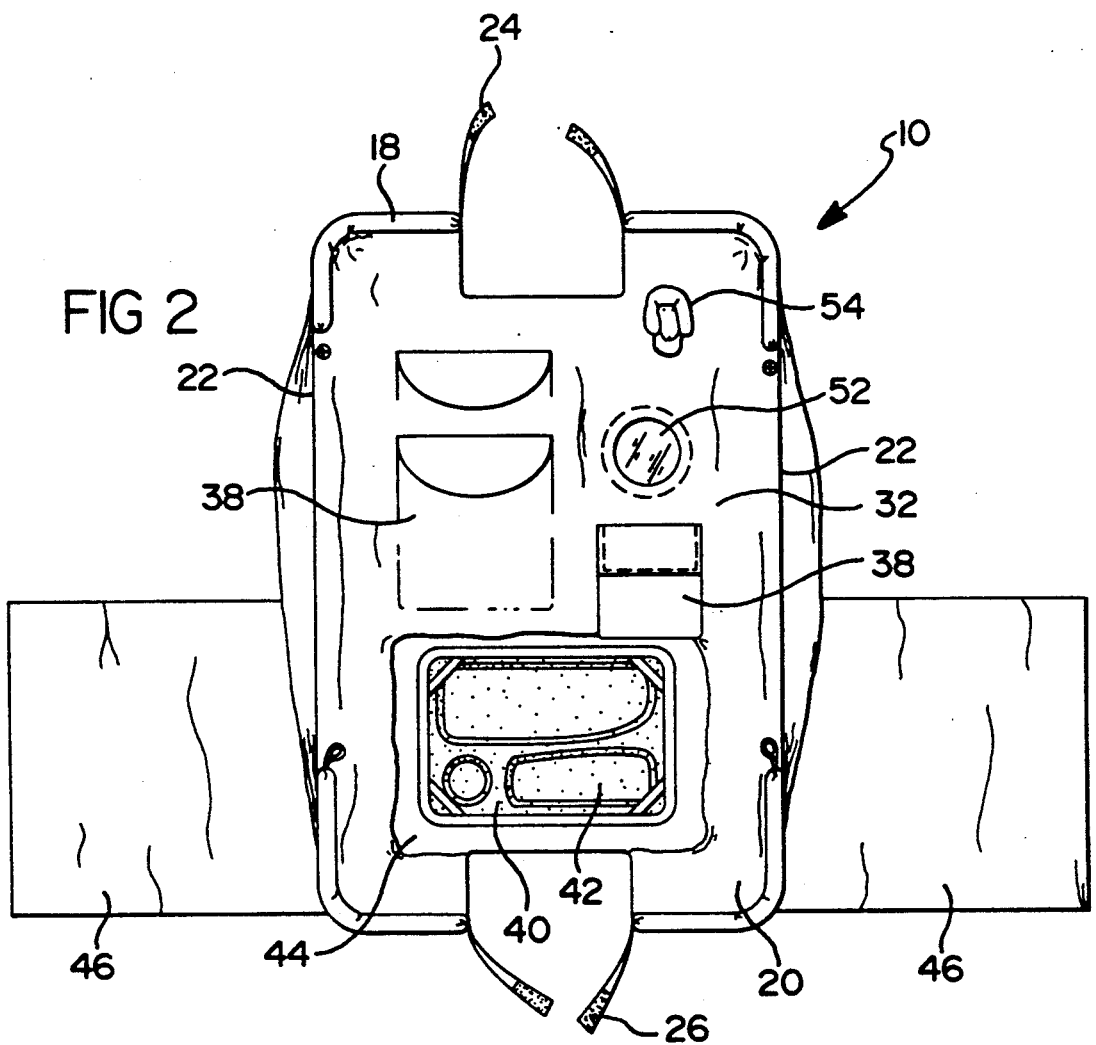
FIG. 2 is a top view of the entertainment and feeding device of FIG. 1 seen as removed from the rear seat.

As can be more clearly seen in FIG. 2, the upper surface 32 of the device 10 is provided with entertainment pieces which are permanently attached to the device 10. Suggested examples are a reflective foil 52 in which the child can see his or her reflection and a puppet 54 which can be sized to fit a flashlight (not shown) for illumination during night trips. The upper surface 32 also has compartments 38 for storing games and toys (not shown). The compartments 38 are preferably closable so as to prevent the toys and games from falling out during moving.

Figure 4A:
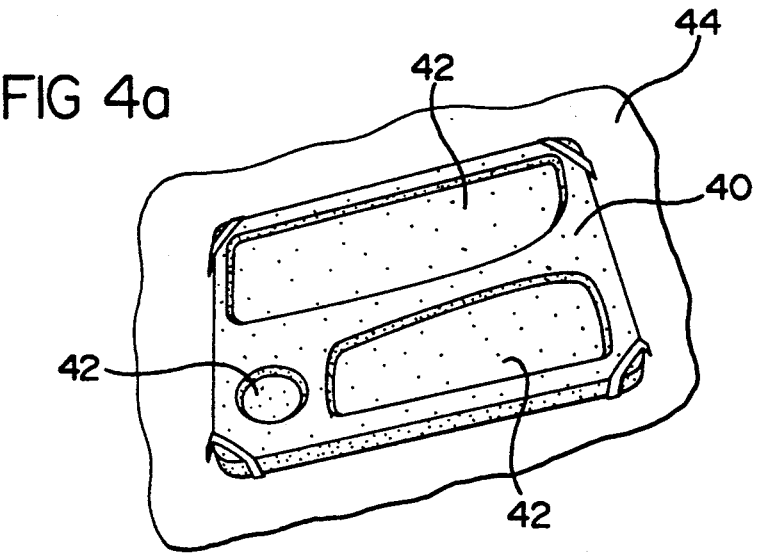
FIGS. 4 and 4b illustrate the food tray of the entertainment and feeding device showing that the tray has food compartments on its upper surface and is flat on its bottom surface.
Figure 4B:
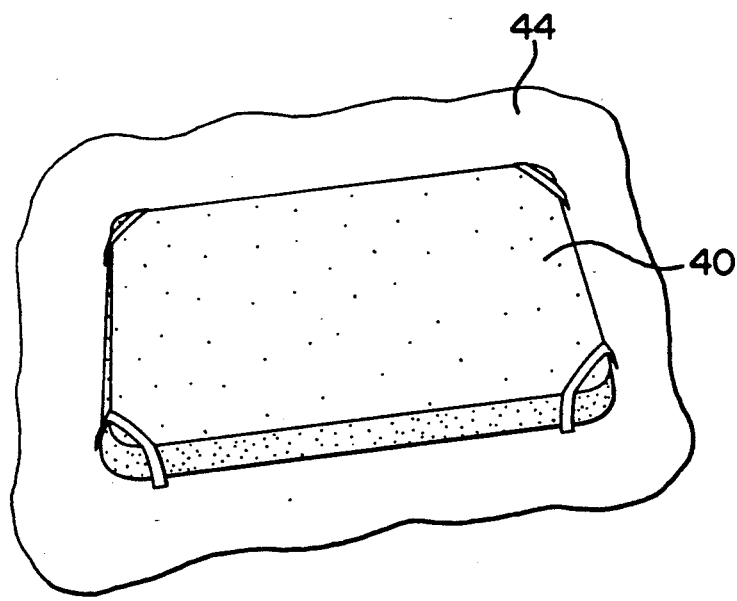

On the upper surface 32 adjacent the rearward end 20 there is provided a food tray 40 for accommodating food service. The food tray 40 has food compartments 42 on its upper surface for containing food and a beverage on the food tray 40. As an added feature, the food tray 40 can be removable and provided with a flat bottom surface such that when overturned, the tray can serve as a table top. FIGS. 4a and 4b show food tray 40 having food compartments 42 on its upper surface and having a flat bottom surface. In addition, the food tray 40 can be nested within a foam article 44 which is removable for use as a pillow for the child 12.

For providing further protection of the rear seat 14, side flaps 46 are attached adjacent the rearward end 20. The side flaps 46 extend laterally in opposite directions from the device 10 to cover the rear seat portions on either side of the child 12.

To install the device 10, the forward fastener 24 is attached to the front seat head rest 28, with the upper surface 32 face up. The child is then seated either on the rear seat 14 or in a child seat (not shown) and the rearward fastener 26 is fastened around the child's waist. Side flaps 46 are then extended to either side of the device 10 to insure protection of adjacent portions of the rear seat 14.

Figure 3:
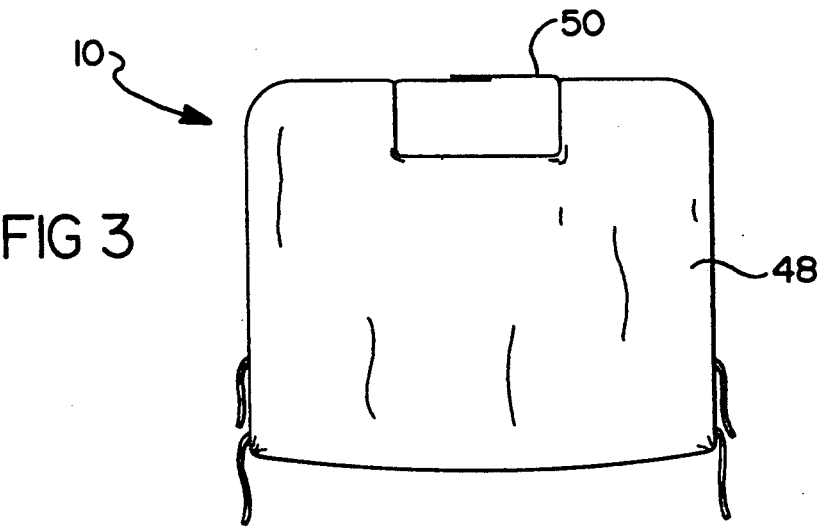
FIG. 3 illustrates the entertainment and feeding device of FIG. 1 as folded for purposes of transporting in accordance with a preferred embodiment of this invention.

Removal of the device 10 is a simple matter of reversing the above sequence. Once removed, the device 10 conveniently forms a portable carrying bag 48, as seen in FIG. 3. The forward and rearward fasteners 24 and 26 together form a carrying handle 50. A given number of the child's toys and games can then be readily transported within the carrying bag 48.

A significant advantage of providing a device 10 with the features described above is that the device 10 affords protection of the interior 30 of the automobile 16. The forward and rearward fasteners 24 and 26 extend the device 10 between the child 12 and the front seat head rest 28 so as to cover that portion of the interior 30 of the automobile 16, thereby protecting it from food and damage by games or toys. Protection of the rear seat 14 is provided by the side flaps 46 which extend laterally in opposite directions from the device 10 to cover the portions of the rear seat 14 on either side of the child 12.

An additional advantage of the device 10 with the above features is that the device 10 can provide the child 14 with a form of entertainment. In the preferred embodiment, the device is provided with a variety of permanently attached entertainment pieces, such as the reflective foil 52 and the puppet 54. In addition, the device 10 can also accommodate favorite portable toys and games of the child by being equipped with compartments 38 which are adequately sized to provide storage.

While the invention has been described in terms of a preferred embodiment, it is apparent that other forms could be adopted by one skilled in the art. Accordingly, the scope of the invention is to be limited only by the following claims.

What is claimed is:

1. An entertainment and feeding device for use by a child occupant of a rear seat of an automobile having a front seat head rest, said device comprising:
   a flexible sheet having a rectangular portion with a forward end and a rearward end, said flexible sheet having oppositely disposed arc-shaped side portions attached to said rectangular portion and extending the entire length of said rectangular portion between said forward and rearward ends, said flexible sheet having an upper surface, said flexible sheet being adapted to cover and protect said rear seat and interior of said automobile;
   rearward fastening means attached to said rearward end, said rearward fastening means being adapted to fasten around the waist of said child;
   forward fastening means attached to said forward end, said forward fastening means being adapted to be fastened to said front automobile seat head rest;
   said arc-shaped side portions extending upwardly between said forward and rearward ends to provide sidewalls to said flexible sheet, each of said arc-shaped side portions having a curved side and a straight side each said straight side having a top edge and being attached to said rectangular portion along the entire length of said curved side wherein said sidewalls have reinforcing edges at said top edge extending substantially continuously from said rearward fastening means to said forward fastening means so that the device between the forward and rearward ends may be suspended from the reinforcing edges.

at least one entertainment device attached to said upper surface of said sheet, a food tray means for accommodating food, said food tray means being located on said upper surface and adjacent said rearward end of said flexible sheet, said food tray means having food compartments on a top surface and being flat on an oppositely disposed bottom surface, said food tray means being removable from said flexible sheet such that said food tray means provides a flat surface when said food tray means is overturned and replaced on said upper surface.

wherein said child's entertainment and feeding device forms a portable carrying bag when said forward and rearward fastening means are detached from said front seat head rest and the child, and when the child's entertainment and feeding device is folded in half, and the forward and rearward fastening means are placed together to form a carrying handle, a portable carrying bag is formed which can contain the clutter and food mess created by the child sot hat the mess can be easily contained, removed and cleaned before reinstalling, thereby leaving the automobile interior clean.

2. A device as claimed in claim 1, wherein said food tray means is received on a foam article.

3. A device as claimed in claim 1 further comprising a pair of side flap portions attached adjacent said rearward end, said pair of side flap portions extending oppositely from said flexible sheet, said pair of side flap portions further protecting said rear seat and said interior of said automobile.

4. A device as claimed in claim 1 further comprising pockets formed in said flexible sheet, said pockets being adapted to receive portable entertainment devices therein.

5. A device claimed in claim 1, wherein said device has only a single rearward fastening means and a single forward fastening means.

* * * * *